US006527473B2

United States Patent
Chen

(10) Patent No.: US 6,527,473 B2
(45) Date of Patent: Mar. 4, 2003

(54) CONNECTOR FOR LINEARLY CONNECTING TWIN-COLUMN SUPPORTING POSTS OF SECTIONAL RACK

(75) Inventor: Henry Chen, Taipei (TW)

(73) Assignee: Protrend Co., Ltd., Taipei (TW)

( * ) Notice: Subject to any disclaimer, the term of this patent is extended or adjusted under 35 U.S.C. 154(b) by 0 days.

(21) Appl. No.: 09/917,408

(22) Filed: Jul. 26, 2001

(65) Prior Publication Data

US 2003/0021627 A1 Jan. 30, 2003

(51) Int. Cl.[7] .............................. F16B 2/18; F16B 7/04
(52) U.S. Cl. .................... 403/374.1; 211/182; 211/194; 403/322.4
(58) Field of Search .............................. 403/320, 321, 403/322.3, 322.4, DIG. 8, 49, 173, 385, 396, 314, 343, 350, 409.1, DIG. 4, 374.1, 373, 374.2, 374.5, 342; 108/91, 110, 190, 192; 24/563, 68 CD, 457, 458; 211/182, 194

(56) References Cited

U.S. PATENT DOCUMENTS

| 4,786,022 A | * | 11/1988 | Grieshaber ........... 403/374.5 X |
| 5,803,642 A | * | 9/1998 | Sassmannshausen |
| 5,888,197 A | * | 3/1999 | Mulac et al. ............... 403/396 |
| 6,113,042 A | * | 9/2000 | Welsch et al. .............. 108/110 |
| 6,240,856 B1 | * | 6/2001 | Paskey et al. |

* cited by examiner

Primary Examiner—Lynne H. Browne
Assistant Examiner—Victor MacArthur
(74) Attorney, Agent, or Firm—W. Wayne Liauh

(57) ABSTRACT

A connector is configured to securely hold two twin-column supporting posts of an upper and a lower side supporter of a sectional rack to a linearly connected position. With the connector, the side supporters having twin-column supporting posts of the rack could be assembled from two or more shortened units. The shortened units of side supporters allow the disassembled rack to be packed into a largely reduced volume to facilitate convenient and economical transport and storage of the rack.

3 Claims, 7 Drawing Sheets

CONNECTOR FOR LINEARLY CONNECTING TWIN-COLUMN SUPPORTING POSTS OF SECTIONAL RACK

BACKGROUND OF THE INVENTION

The present invention relates to a connector for securely holding two twin-column supporting posts of a sectional rack to a linearly connected position, so that the supporting posts of the sectional rack could be assembled from two or more shortened units to facilitate convenient packing, transporting and storing of the sectional rack.

FIG. 1 shows a sectional rack having two side supporters 10, each of which includes two twin-column supporting posts 11. A plurality of horizontal braces 12 are spaced between the two supporting posts 11 to connect the latter together and form the side supporter 10. The rack has an overall height determined by the height of the side supporters 10. To erect a sectional rack of 180 cm in height, the side supporters 10 must have a height of 180 cm. The longer the side supporter 10 is, the bigger the package of the sectional rack is. A big package would result in increased costs for packing, transporting and storing the rack, and is inconvenient for a consumer to carry it home. It is therefore tried by the inventor to develop a connector for linearly connecting two side supporters 10 that have twin-column supporting posts 11, so that the side supporters 10 of the sectional rack could be assembled from two or more shortened units to enable a length-reduced package for the sectional rack.

SUMMARY OF THE INVENTION

A primary object of the present invention is to provide a connector for linearly connecting twin-column supporting posts of two upper and lower side supporters of a sectional rack, so that the sectional rack in a disassembled state could be packed into a reduced volume for convenient transport and storage thereof.

To achieve the above and other objects, the connector of the present invention mainly includes a vertical channel having upper and lower open ends, via which two twin-column supporting posts of a sectional rack are separately inserted into the channel; and a side opening having an upper and a lower eccentric rotary shafts horizontally mounted across an upper and a lower end thereof. When the eccentric rotary shafts are turned to press their eccentric portions against the twin-column supporting posts inserted into the channel, the two twin-column supporting posts are securely held in the channel to a linearly connected position.

In the present invention, both the upper and the lower eccentric rotary shafts are provided with a handle. By pushing the handles, the eccentric rotary shafts could be pivotally turned.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
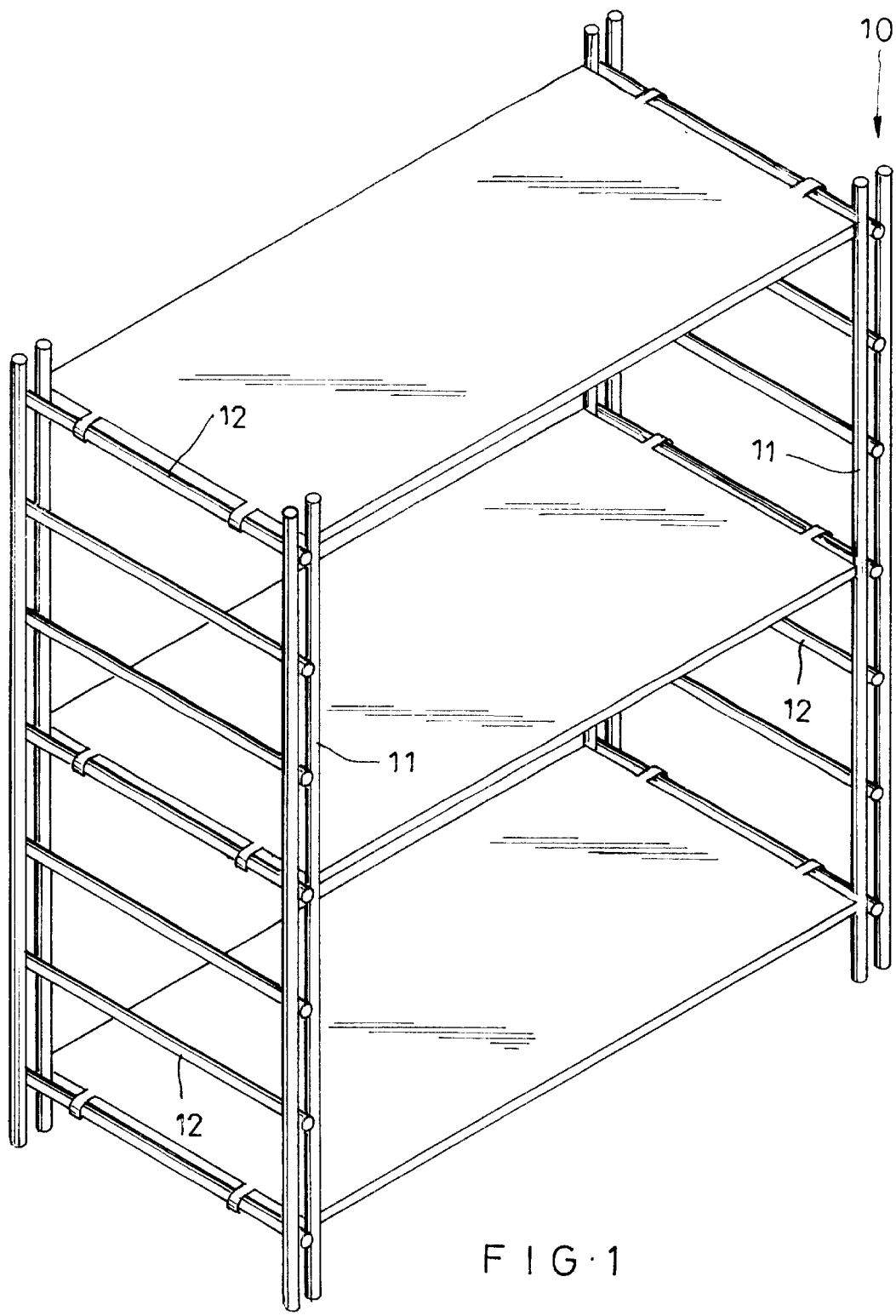
FIG. 1 is a perspective view of a sectional rack, of which two side supporters have twin-column supporting posts.
Figure 2:
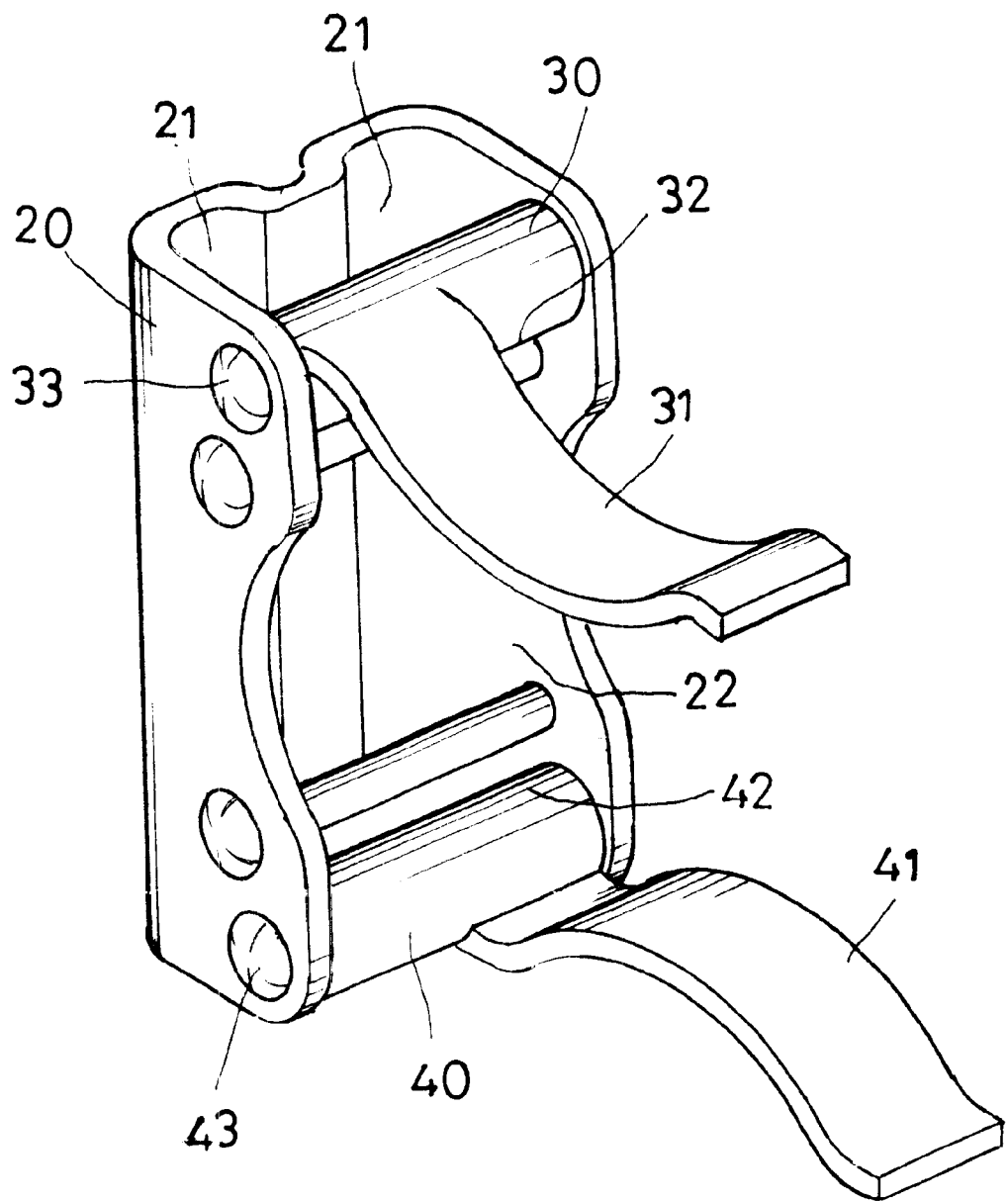
FIG. 2 is an assembled perspective view of a connector of the present invention.
Figure 3:
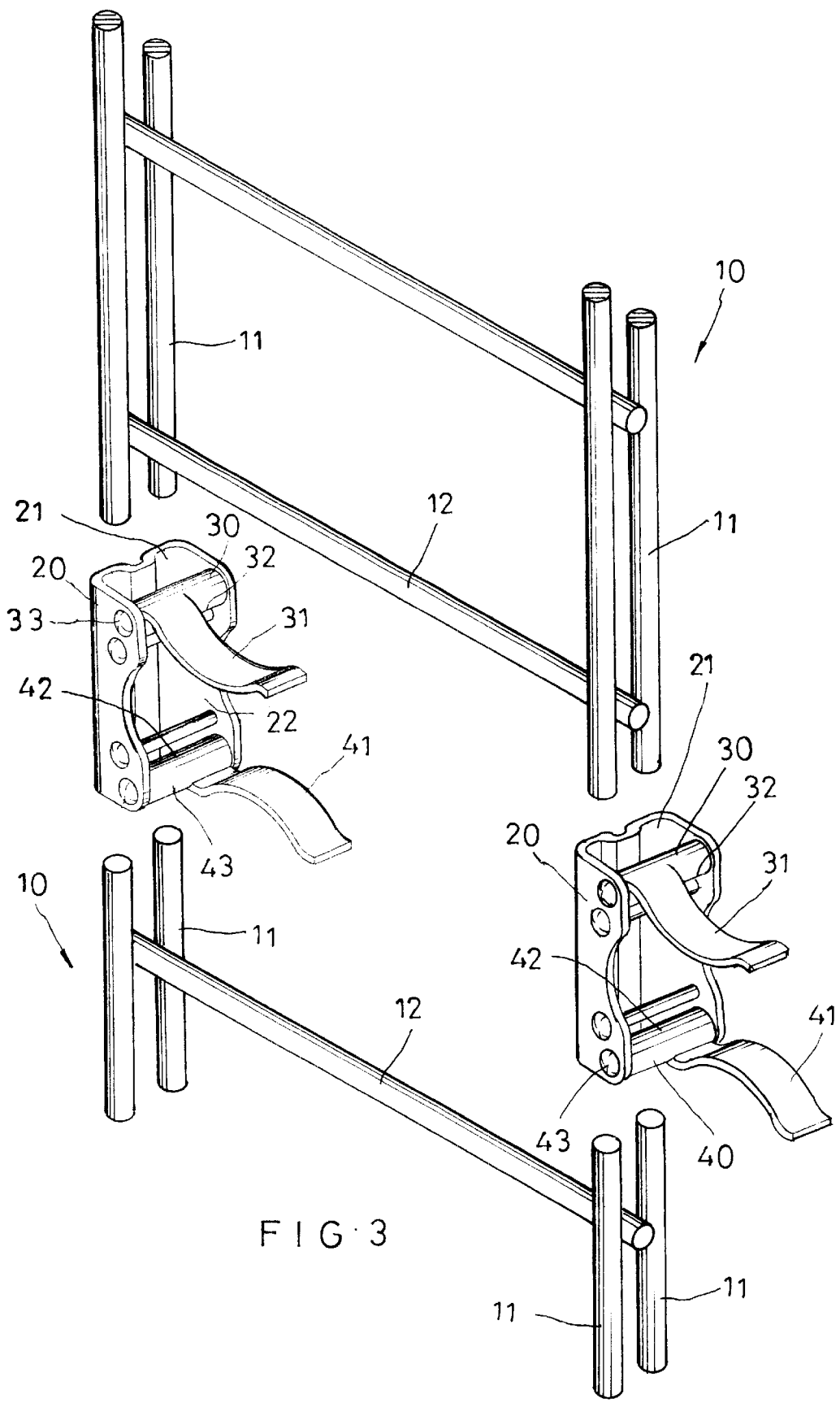
FIG. 3 is an exploded perspective view showing the use of the connector of the present invention to connect upper and lower side supporters of a sectional rack having twin-column supporting posts.

Please refer to FIGS. 2 and 3 that shows a connector of the present invention for linearly connecting an upper and a lower side supporter 10 of a sectional rack. Each of the side supporter 10 includes two vertical twin-column supporting posts 11, and a plurality of horizontal braces 12 spaced between the two supporting posts 11 so as to connect the supporting posts 11 together.

The connector 20 defines a vertical channel 21 for two twin-column supporting posts 11 of an upper and a lower side supporter 10 of the sectional rack to separately insert thereinto via an upper and a lower end thereof. The connector 20 also defines a side opening 22. An upper and a lower eccentric rotary shaft 30, 40 are horizontally mounted across upper and lower ends of the side opening 22. Both the upper and the lower eccentric rotary shaft 30, 40 include a handle 31, 41 and an eccentric portion 32, 42.

Figure 6:
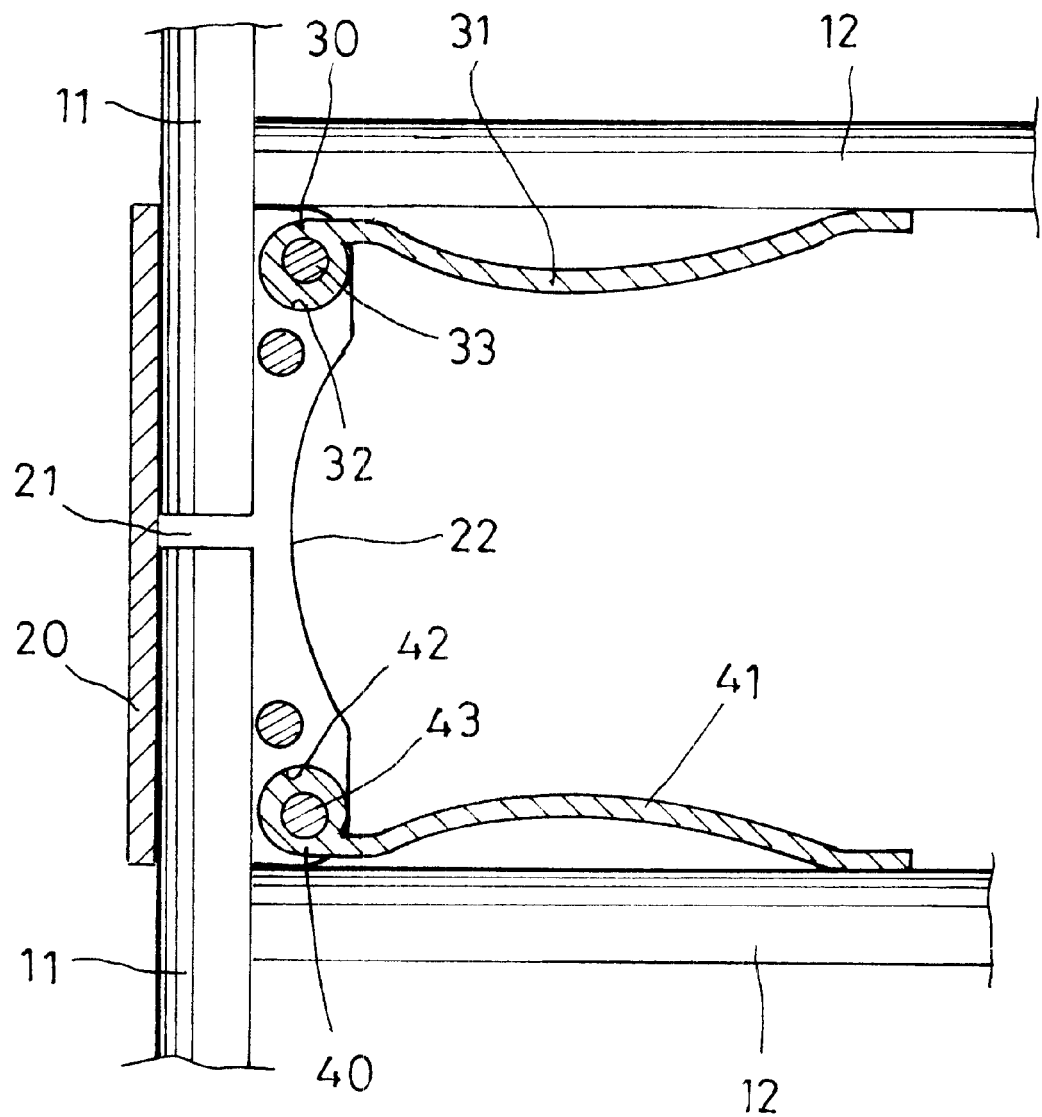
FIG. 6 is a partially sectioned side view showing two eccentric rotary shafts of the connector of the present invention are in a released position without pressing against the twin-column supporting posts.

The eccentric rotary shafts 30, 40 are separately rotatably mounted on two fixed spindles 33, 43, such that a distance between an outer surface of each eccentric portion 32, 42 of the eccentric rotary shaft 30, 40 and the fixed spindle 33, 43 is longer than a distance between any other portion on the eccentric rotary shaft 30, 40 and the fixed spindle 33, 43. The eccentric rotary shafts 30, 40 are so configured that the eccentric portion 32 of the upper eccentric rotary shaft 30 is oriented downward and the eccentric portion 42 of the lower eccentric rotary shaft 40 is oriented upward when the connector 20 is in a released position or in a state not being used to pressing against the twin-column supporting posts 11 inserted into the channel 21, as shown in FIG. 6.

Figure 4:
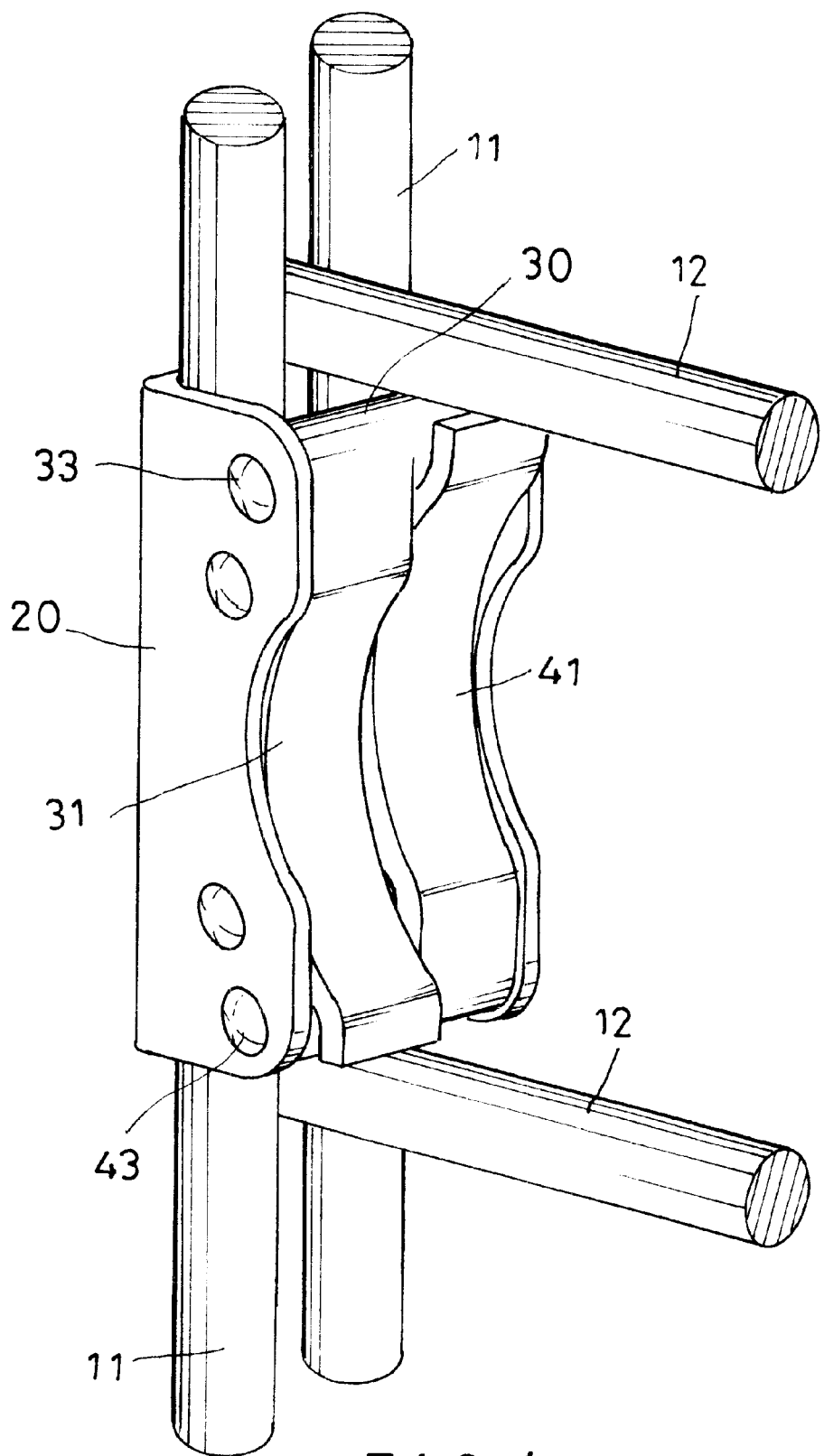
FIG. 4 is a fragmentary, enlarged and assembled perspective view of FIG. 3.
Figure 5:
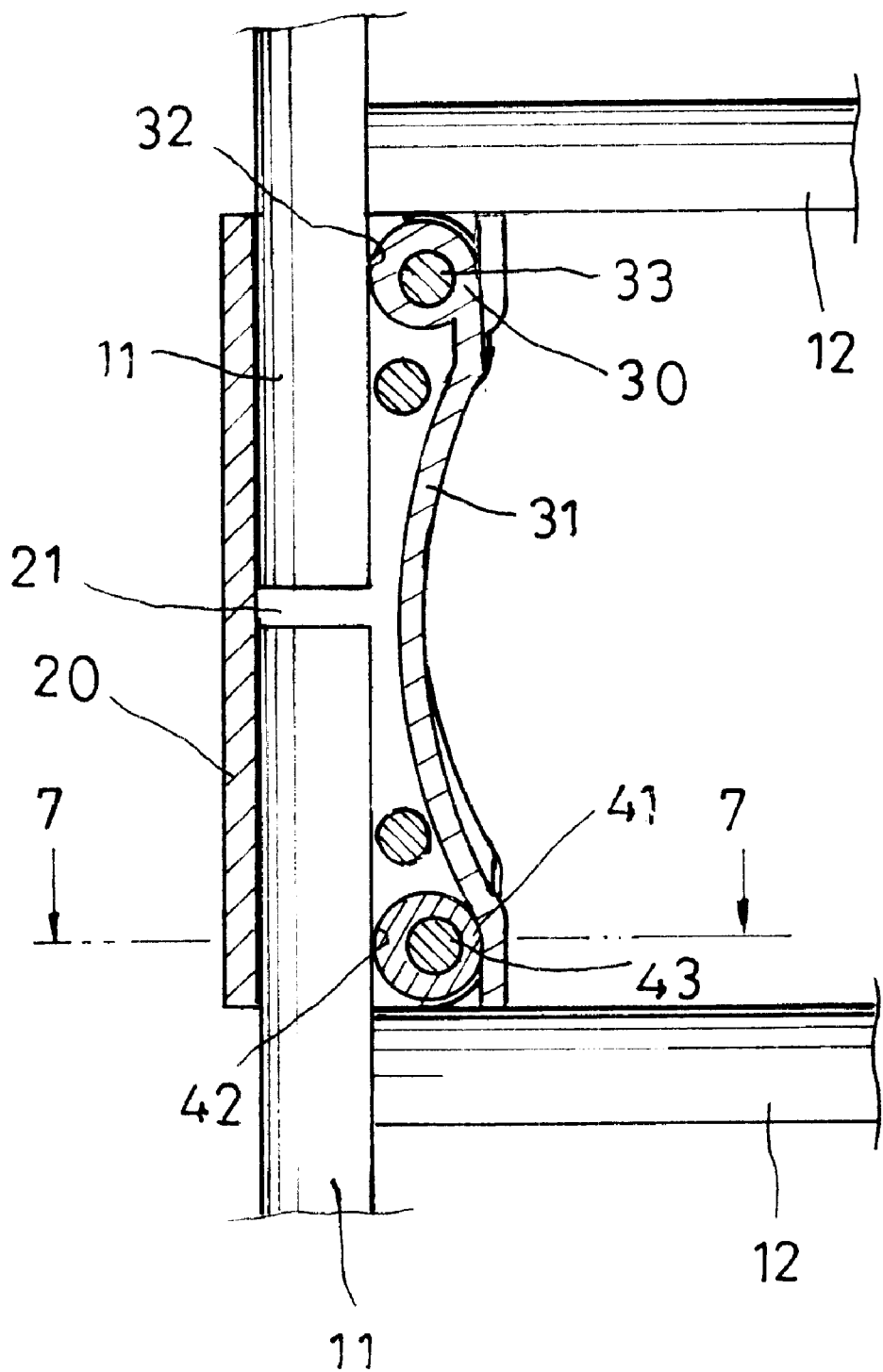
FIG. 5 is a partially sectioned side view of FIG. 4.

Please refer to FIGS. 4 and 5. When the handle 31 of the upper eccentric rotary shaft 30 is fully turned downward, the eccentric portion 32 is moved upward to contact with and press against the twin-column supporting post 11 of the upper side supporter 10 downward inserted into the channel 21 via the upper end thereof; and, when the handle 41 of the lower eccentric rotary shaft 40 is fully turned upward, the eccentric portion 42 is moved downward to contact with and press against the twin-column supporting post 11 of the lower side supporter 10 upward inserted into the channel 21 via the lower end thereof. With the eccentric portions 32, 42 of the upper and the lower eccentric rotary shafts 30, 40, respectively, of the connector 20 firmly pressing against the twin-column supporting posts 11 of the upper and the lower side supporters 10, the two side supporters 10 are linearly connected in a vertical direction.

FIGS. 4 and 5 also shows an upper stop 34 and a lower stop 44 disposed after the upper eccentric shaft 33 and the lower eccentric rotary shaft 34, respectively, for further preventing pivotal motions of the twin-column supporting posts.

Figure 7:
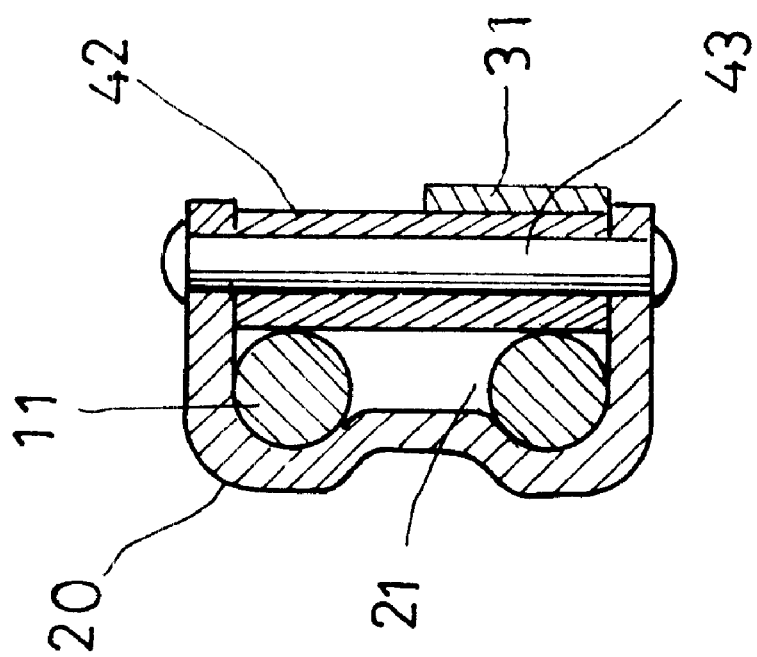
FIG. 7 is a sectional view taken on line 7—7 of FIG.

The channel 21 of the connector 20 is configured to have a cross sectional shape similar to that of the twin-column supporting post 11, so that the twin-column supporting post 11 is effectively confined in the channel 21. That is, when the twin-column supporting post 11 is inserted into the channel 21, it is in contact with and prevented from moving by three wall portions of the channel 21 other than the side opening 22. This allows the twin-column supporting posts 11 to locate in the channel 21 without the risk of easily displacement even when the eccentric rotary shafts 30, 40 are not pressed against it. Further, when the eccentric portion 32, 42 of the eccentric rotary shaft 30, 40 is caused to press against the twin-column supporting post 11, the latter is held in place not only at three sides in contact with the wall portions of the channel 21, but also at a fourth side facing the eccentric rotary shaft 30, 40, as shown in FIG. 7. That is, the twin-column supporting post 11 being pressed against the channel 21 in the connector 20 by the eccentric rotary shaft 30, 40 is subjected to confining forces from front, back, left and right sides thereof and is therefore firmly and immovably disposed in the connector 20.

The connector 20 could be very easily handled without using any tool. A consumer could assemble the sectional rack having such twin-column supporting posts 11 and the connectors 20 of the present invention by way of DIY. Further, when the twin-column supporting posts 11 of the upper and the lower side supporters 10 have been linearly connected by the connector 20, the handles 31, 41 of the upper and the lower eccentric rotary shafts 30, 40 are in positions closely attached to the connector 20 for the latter to occupy a minimized space. To erect a sectional rack having an overall height of 180 cm, the side supporters 10 thereof could be assembled from two or even three units with each unit being 90 cm or 60 cm in height. These shortened side supporters 10 enable the rack in a disassembled state to be packed in a package having a largely reduced overall length that is sufficient for containing the disassembled units of the side supporters 10 and other related components of the rack. Thus, the connector of the present invention allows a sectional rack having twin-column supporting posts to be packed into largely reduced dimensions to facilitate packaging, transporting and storing of the sectional rack.

In brief, the connector of the present invention has simple structure and can be conveniently handled to firmly hold two twin-column supporting posts of a sectional rack to a linearly connected position. The connector of the present invention also allows the sectional rack with twin-column supporting posts to have further reduced volume when the rack is disassembled, so that the rack could be transported and stored at reduced cost.

What is claimed is:

1. A connector for holding two twin-column supporting posts of a sectional rack to a linearly connected position, comprising:

a vertical channel having upper and lower open ends, via which said two twin-column supporting posts are separately inserted into said channel; and a side opening having an upper and a lower eccentric rotary shafts horizontally mounted across an upper and a lower end thereof;

each of said upper and said lower eccentric rotary shafts being provided with a handle for turning said eccentric rotary shafts, so that two eccentric portions separately provided on said upper and said lower eccentric rotary shafts are caused to tightly and separately press against said two twin-column supporting posts in said channel and thereby securely hold said two twin-column supporting posts to the linearly connected position;

wherein said two twin-column supporting posts are received in said vertical channel in a head-facing-tail manner without overlapping each other.

2. The connector for holding two twin-column supporting posts of a sectional rack according to claim 1, wherein said connector further comprises an upper stop and a lower stop disposed after said upper and said lower eccentric rotary shafts, respectively, for further preventing pivotal motions of said twin-column supporting posts.

3. The connector for holding two twin-column supporting posts of a sectional rack according to claim 1, wherein said twin-column supporting posts are of the same shape and dimension, so that said two twin-column supporting posts appear to be integrally formed after they are connected by said connector.

\* \* \* \* \*